United States Patent [19]
Rush

[11] 3,890,497
[45] June 17, 1975

[54] ILLUMINATED SAFETY POLE FOR BICYCLES OR THE LIKE

[75] Inventor: David H. Rush, Belle Harbor, N.Y.

[73] Assignee: Chromalloy Electronics Div. Chromalloy American Corp., Hollywood, Fla.

[22] Filed: Mar. 18, 1974

[21] Appl. No.: 451,741

[52] U.S. Cl............ 240/7.55; 116/124 R; 116/173; 240/1 LP; 240/6.42; 240/58; 280/289
[51] Int. Cl............................................. F21g 1/00
[58] Field of Search..... 240/1 EL, 1 LP, 7.55, 10 L, 240/58, 10.66:6.42, 10.68; 130 R;130 K; 116/63 R, 63 P, 124 R, 173; 280/150 R, 289; 404/15, 16; 350/96 R, 97; 180/1 AP

[56] References Cited
UNITED STATES PATENTS

| | | | |
|---|---|---|---|
| 1,950,548 | 3/1934 | Fuller | 240/1 EL |
| 2,099,671 | 11/1937 | Bairey | 350/97 |
| 2,225,151 | 12/1940 | Bolba | 240/1 EL |
| 2,372,471 | 3/1945 | Campbell | 350/96 R |
| 2,420,772 | 5/1947 | Dalton | 240/81 A |
| 2,473,981 | 6/1949 | Wood | 240/81 A |
| 2,636,109 | 4/1953 | Cone | 240/1 EL |
| 3,108,277 | 9/1963 | Thomas | 240/81 A |
| 3,318,216 | 5/1967 | Hajjar | 240/1 EL |
| 3,812,815 | 5/1974 | Kuenzel | 116/173 |

Primary Examiner—Joseph F. Peters, Jr.
Attorney, Agent, or Firm—Darby & Darby

[57] ABSTRACT

An illuminated safety pole that may be attached to a bicyle or the like, made of a transparent material that acts as a light pipe and is partially covered with a spiral strip of material that causes light to be emitted from side of the pole opposite to the covering material, causing the pole to appear illuminated in sections.

11 Claims, 4 Drawing Figures

PATENTED JUN 17 1975
3,890,497
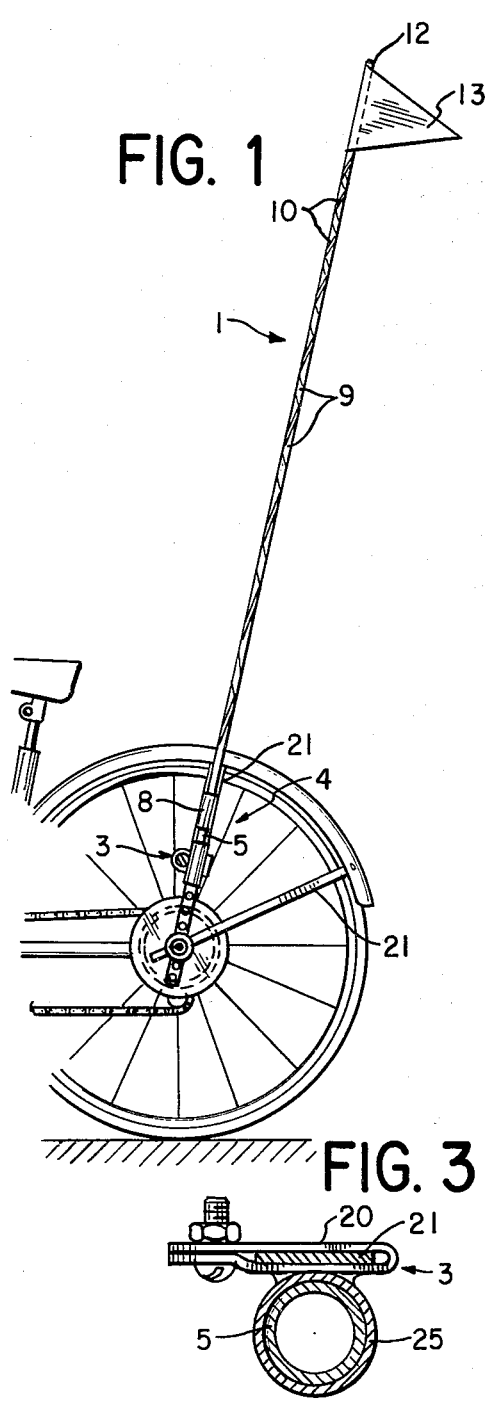
FIG. 1
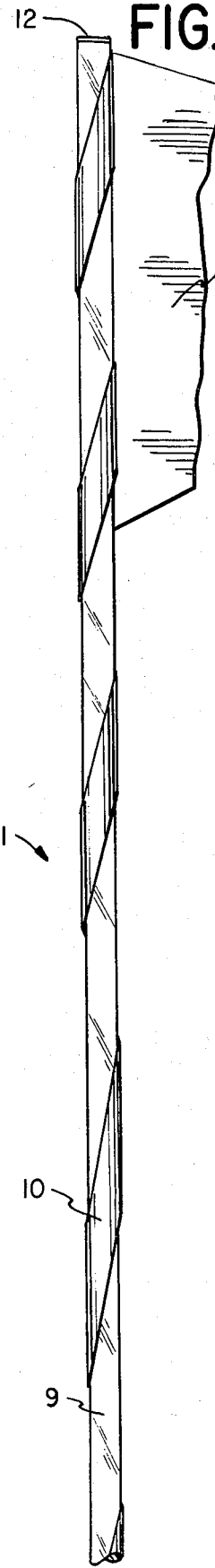
FIG. 2A
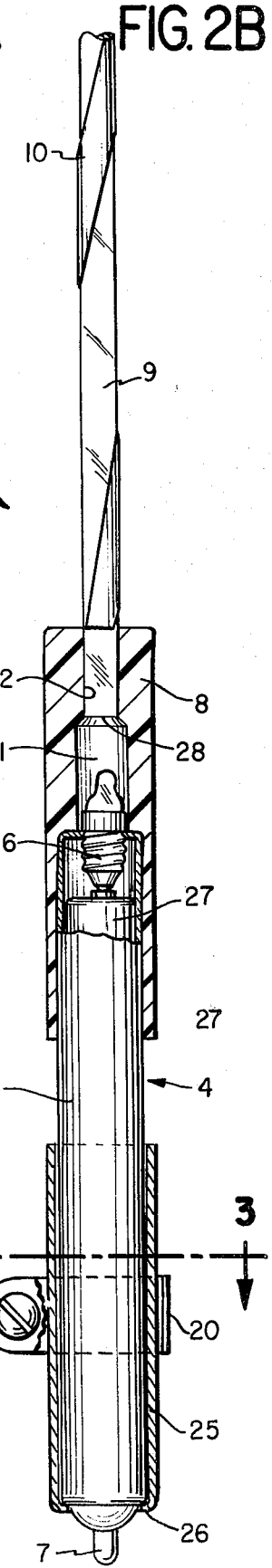
FIG. 2B
FIG. 3

ILLUMINATED SAFETY POLE FOR BICYCLES OR THE LIKE

BACKGROUND OF THE INVENTION

With the increase in recent years of the amount of time available for leisure time activities, bicycle riding has become more popular as more people have realized its recreational value. The use of bicycles has also increased because many people, for example, college students, have realized that bicycles constitute an inexpensive and rapid means of transportation that avoids the parking problems associated with the use of automobiles in congested urban areas. The use of motorcycles has also increased for the same reasons. Unfortunately, bicycles and motorcycles are used primarily on roads and streets which, in a society geared to transportation by automobile, are used primarily by automobiles. As a result, drivers are conditioned to looking only for other automobiles and (near intersections) pedestrians, and often do not readily notice bicyles or similar small vehicles. The problem of drivers in becoming aware of bicycles becomes far worse at night, when the relatively small size of bicycles makes them difficult to be seen, even when illuminated by automobile headlights, and the reflectors and lights mounted on either the bicylce or the rider often do not either reflect or emit sufficient light to enable them to be readily seen by drivers.

There are basically several reasons for inadequacy of the lights and reflectors. Lights or reflectors on bicycles are often small which makes it difficult for drivers to see them. However, it is very difficult to make either the present types of reflectors or lights much larger without severely restricting the normal operation of the bicycles. The effectiveness of lights is further decreased by the fact that they emit light in a limited cone rather than in all directions. If the automobile driver does not travel within the cone of emitted light he will be unable to see the light. Similarly, the effectiveness of reflectors is reduced if the automobile driver does not face them directly as the apparent area of the reflector as seen by the driver is greatly reduced. Although this will always constitute a problem, the problem will be worst at intersections because the automobile and the bicycle are moving perpendicularly to each other. Bicycle lights usually are directed toward the front or the rear of the bicycle and reflectors are normally mounted on the rear of the bicycle. This arrangement of both lights and reflectors makes it difficult if not impossible for the driver to see them under these circumstances. Lights and reflectors are also difficult to see because they do not form an attention-getting pattern.

The above mentioned drawbacks can be reduced by extending the light above the bicycle which will have the advantage of not hindering the operation of the bicycle. Furthermore, by giving the light source the shape of a pole, it can be made, as will be seen below, to emit light in all directions, thus making it far easier for drivers to see it. In addition, by making such pole flexible, it will move in the wind during the bicycle's operation and its waving will further attract attention. Furthermore, such a light may be low in weight and capable of being easily attached to and removed from the bicycle. These qualities insure that the light will not interfere with the bicycle's operation and, where desired, permit the owner to remove the light from the bicycle when it is parked, thus reducing the risk of loss.

Further advantage is attained by attaching a reflecting material to the pole to reflect light from automobile headlights, to provide a warning in addition to the light produced by the pole. This reflecting material, if wrapped around the pole, will also be visible in all directions. The emitting and reflecting materials may be arranged to form an attention-getting pattern.

SUMMARY OF THE INVENTION

It is an object of the invention to provide a device for making bicycles or the like more visible to automobile drivers at nighttime, and visible in all directions.

It is a further object of the invention to provide such a device with a pattern designed to attract attention to it.

It is still a further object of the invention to provide such a device that both emits light and is a reflector, effective for all directions, of light coming from automobile headlights or the like.

It is yet another object of the invention to provide such a device that is light in weight and easily attached to and removed from bicycles and does not interfere with the normal operation of the bicycle.

These and other objects of the invention will be apparent from consideration of the following description together with the appended drawings, in which:

BRIEF DESCRIPTION OF THE DRAWINGS

FIG. 1 is a side view showing an illuminated safety pole, according to the invention, shown attached tc a bicycle.

FIG. 2a is a side view of the top of the safety pole of FIG. 1.

FIG. 2b is a side view partly in section of the lower portion of the safety pole of FIG. 1, showing a representative mounting bracket.

FIG. 3 is a horizontal cross-sectional view of the pole and mounting bracket taken along the line 3—3 in FIG. 2b.

DESCRIPTION OF THE PREFERRED EMBODIMENT

While the invention is particularly useful as a bicycle warning device, it is not limited to such use, but may be used with other vehicles or stationary devices. For convenience and illustration it will be described as a safety device for bicycles.

As shown in FIG. 1, the safety pole 1 is attached to the bicycle by means of any suitable mounting bracket 3, located at the lower end of pole 1. Bracket 3 may be attached to any desired member or part of the frame of the bicycle, such as a fender support or frame strut, preferably at the rear of the bicycle so as to avoid interference with normal operation of the bicycle.

As illustratively shown in FIG. 3, bracket 3 has a clamp 20 which encircles the bicycle member 21 to hold bracket 3 in place. A collar 23 is suitably secured to clamp 20 in any desired manner as by brazing, and holds a sleeve 25, in which is retained a light source. In one illustrative embodiment, the light source 4 may have a construction like a conventional pen flashlight, having a cylindrical outer tube 5 supported within sleeve 25 by a bottom shoulder 26. Within tube 5 are one or more batteries 27, to provide electrical power for a light bulb 6 mounted at the top of tube 5. A switch 7 at the lower end of the light source serves to connect the battery or batteries to the light bulb 6 to cause the bulb to create light.

The principal feature of the safety pole 1 of the invention is the solid light pole or wand 9, preferably formed of a transparent material having the property of a "light pipe"; that is, the property of transmitting along the length of the pole light entering at one end until it reaches the other end, by means of multiple internal reflections at the interface between the plastic material and the outside air. Suitable materials, such as acrylics exemplified by plexiglass or lucite, can even transmit light around corners, through such "light pipes."

The pole 9 is supported to have its lower end illuminated by the light bulb 6. For this purpose, a pole support 8 is mounted over the upper end of light source tube 5 and bulb 6, with a recess 31 into which the light bulb 6 extends, and a bore 32 which receives and supports the lower end of the pole 9 which may be cemented or force-fitted therein. The support 8 is preferably removably secured to the tube 5, as by a friction or threaded fit.

The light bulb 6 is preferably of the pre-focussed type (e.g., type GE 222) which will efficiently project a narrow beam of light upwardly. To maximize the amount of light from bulb 6 which enters the lower end of wand 9, the wand 9 and bulb 6 are positioned as closely together as practicable. Additional light may be caused to enter the lower end of the wand by polishing it, as to an optical flat finish.

Normally, when light enters the lower end of a light pipe like wand 9, the light will pass upward along the length of the wand to the upper end. Because of the multiple internal reflections, essentially no light escapes through the side wall of the wand, and it therefore does not appear illuminated or bright.

It has been discovered, however, that the wand can be made to appear illuminated by modifying the plastic/air interface. This can be done by replacing the air in contact with the wand by a film of different material; this is believed to change the plastic/air interface so that the critical angle for the light within the wand is modified, to permit light to cross the outer surface of the transparent wand and thereby to escape. This phenomenon is utilized in the present invention to provide the appearance of an internally illuminated wand.

For that purpose, the wand is wrapped with a reflective tape 10 in a generally helical manner. By causing the tape surface which is contiguous to the wand, to be light in color (e.g., white) and light diffusing, the light exiting from the side of the wand is diffused by the tape and re-enters the wand in various directions. A major part of this light passes in directions exceeding the critical angle of the wand material and crosses the wand to exit from the uncovered side opposite the tape. The effect is that the inner surface of the tape appears illuminated and can be viewed through the wand.

By wrapping the tape helically around the wand in a wide pitch with a number of turns along the length, leaving clear spaces between turns, the wand appears to be illuminated in sections along the length, and can be viewed from any direction giving a similar appearance no matter from what direction it is viewed.

This illuminated appearance of the wand can be enhanced by additional features. Thus, the outer surface of the tape may be formed of reflective or retroreflective material, such as Scotchlite, which may be red in color. It then serves to reflect incident light, such as from automobile headlights, to give an additional warning signal, supplementing the wand illumination. A motorist approaching, at night, a bicycle equipped with the present invention will see not only the red reflection of the outer tape surface, but will also see the light (e.g., white in color) scattered from the inner surface of the tape. By virtue of the helical winding, when viewed from any direction, the red reflections will be interspersed with the white scattered light sections, to give alternate red and white areas along the wand height, to enhance the attention-attracting and warning property of the safety pole. The viewing through the transparent pole to the inner face of the tape is further enhanced by the magnification effect of the generally cylindrical pole in front of it, which causes the illuminated area to appear larger by possibly two or three-fold.

Since light supplied by bulb 6 is emitted from the wand progressively along its length, the visible intensity of the emitted light will drop off toward the top. This may be compensated for in two ways. The top end of the wand 9 may be covered or wrapped with a reflecting material 12 which reflects light reaching the top back down the length of the wand 9, to increase the apparent brightness of the upper portions. In addition, the top of the wand may be substantially optically flat and polished to reflect more efficiently any light reaching it. Also, the tape may be wrapped non-uniformly around the wand, with turns closer together as one nears the top. This will also tend to maintain the total amount of light emitted from the pole more nearly constant per unit length. By way of illumination, a wand 48 inches tall may have three turns per foot at the lower end, gradually increasing to 5 to 6 turns per foot at the upper end.

For additional warning, a flag or panel 13 may be mounted on the top of the wand, giving the appearance of a pennant. By forming this of a fluorescent or reflecting or retroreflective material, of any desired color, visibility of the safety pole is enhanced giving a greater degree of safety warning. Alternatively or in addition, the top portion of the pole may be made frosted (as by abrading or sand-blasting or spraying), which will cause it to glow and be visible in all directions.

Desirably, the wand 9 is made sufficiently thin to be somewhat flexible. It will therefore flex in wind or during movement of the bicycle, and its resultant swaying will increase the visibility of the device and further increase its warning capability. The pole may be of uniform cross-section or tapering to a smaller cross-section at the top. Preferably its cross-section is circular, to give similar appearance from all directions, but it may also be non-circular or polygonal in section.

It will be understood that suitable means are provided for permitting replacement of bulb 6 and batteries 27. Thus, pole support 8 may be suitably removably secured to light source tube 5, which in turn may be removably mounted in bracket 23. Alternatively, the adapter 8 and sleeve 25 may be formed intergrally with one another, and the light source may be formed as a conventional penlight, removable bodily from sleeve 25 in any suitable manner.

While the invention has been described as using a wound tape 10, it will be understood that other shapes and types of material, or other means, may be formed or positioned on the outside of the light pipe to cause emission of light across the pole. For example, instead of a tape, strips or other shapes of material may be used, in unitary or separated sections. Also, the material need not be applied as tape, but may be in the form of films or film sections applied by adhesion, or by coating such as by painting. Another way would be to omit such material, and instead abrade (e.g., by sandblasting) the outside of the light pole in the desired pattern (e.g., the spiral band already described). By so doing, the light within the pole will be diffused by the abraded sections, which will glow and be visible in all directions, either by direct viewing or through the transparent pole.

The invention should be understood to be not limited to the particular form described, since obvious variations may be made in the structure described. Rather, the scope of the invention is to be determined by reference to the following claims.

What is claimed is:

1. An illuminated warning device for bicycles or the like comprising:
    a transparent light pipe in the form of an elongated pole;
    a light source adjacent one end of said pole for introducing light into said light pipe for passage along the length thereof; and
    material partially covering the outer surface of said light pipe for causing light within said pipe to be emitted through the side wall thereof opposite said material, said material being positioned intermediate the ends of said light pipe and the side of said pipe opposite said material being uncovered.

2. Apparatus as recited in claim 1 wherein the end of said pole opposite to said light source has a reflector mounted on said end for reflecting light back into said pole.

3. Apparatus as recited in claim 1 wherein said pole is substantially cylindrical.

4. Apparatus as recited in claim 1 wherein the end of said pole adjacent said light source has an optical finish.

5. Apparatus as recited in claim 1 wherein said material comprises a tape having a light-colored surface in contact with the outer surface of said light pipe.

6. Apparatus as recited in claim 5 wherein said tape has an outer surface that reflects light.

7. Apparatus as recited in claim 5 wherein said tape is spirally wrapped around said pole.

8. Apparatus as recited in claim 7 wherein the number of turns of said tape per foot of pole increases toward the end of said pole opposite to said light source.

9. Apparatus as recited in claim 1 wherein said light source comprises:
    a light bulb;
    a power supply for said bulb; and
    a switch for connecting said power supply to said bulb.

10. Apparatus as recited in claim 9 in which said bulb is mounted proximately to said pole end.

11. Apparatus as recited in claim 9 wherein said bulb is prefocused.

* * * * *